United States Patent [19]

Woodworth et al.

[11] Patent Number: 4,550,747
[45] Date of Patent: Nov. 5, 1985

[54] DIGITAL FLUID PRESSURE FLOW RATE AND POSITION CONTROL SYSTEM

[75] Inventors: Raymond D. Woodworth, San Clemente; James F. Stoutamore, Norwalk; Philip S. Vanderhoek, Anaheim, all of Calif.

[73] Assignee: Digital Hydraulics, Inc., Costa Mesa, Calif.

[21] Appl. No.: 539,299

[22] Filed: Oct. 5, 1983

[51] Int. Cl.$^4$ ............................................. G05D 16/00
[52] U.S. Cl. ................................. 137/487.5; 137/85
[58] Field of Search ................ 137/487.5, 486, 485, 137/85; 251/131

[56] References Cited

U.S. PATENT DOCUMENTS

| | | | |
|---|---|---|---|
| 3,113,582 | 12/1963 | Hudson | 137/487.5 X |
| 3,369,561 | 2/1968 | Zimmerman | 137/486 |
| 3,683,958 | 8/1972 | Curnow | 137/489 |
| 4,086,804 | 5/1978 | Ruby | 137/487.5 |

Primary Examiner—Alan Cohan
Attorney, Agent, or Firm—Charles H. Thomas

[57] ABSTRACT

A control valve or system of control valves governs fluid flow by digitally comparing a feedback signal from a fluid control loop with a command signal corresponding to a desired flow rate in a high pressure operating fluid flow line. In the preferred embodiment, a control valve system, such as a pressure relief valve, is operated under the control of a digital computer. The pressure relief valve is operated at a control pressure to regulate flow in an operating hydraulic system. The control pressure chamber is coupled to a relief line through a control pressure reduction valve and to a control pressure enhancement valve which is in communication with the operating line of fluid flow. A feedback signal indicating actual control pressure, flow rate or load position is compared with a command control pressure, flow rate or position. Preferably, the results of several comparisons are averaged together to provide an error correction signal. The error correction signal selectively actuates the pressure enhancement and pressure reduction valves to maintain the desired control pressure, flow rate or load position. The system preferably includes a deactuating means which limits actuation of the control pressure enhancement and reduction valves to the duration of pulses of a width related to the magnitude of the error correction signal.

18 Claims, 9 Drawing Figures

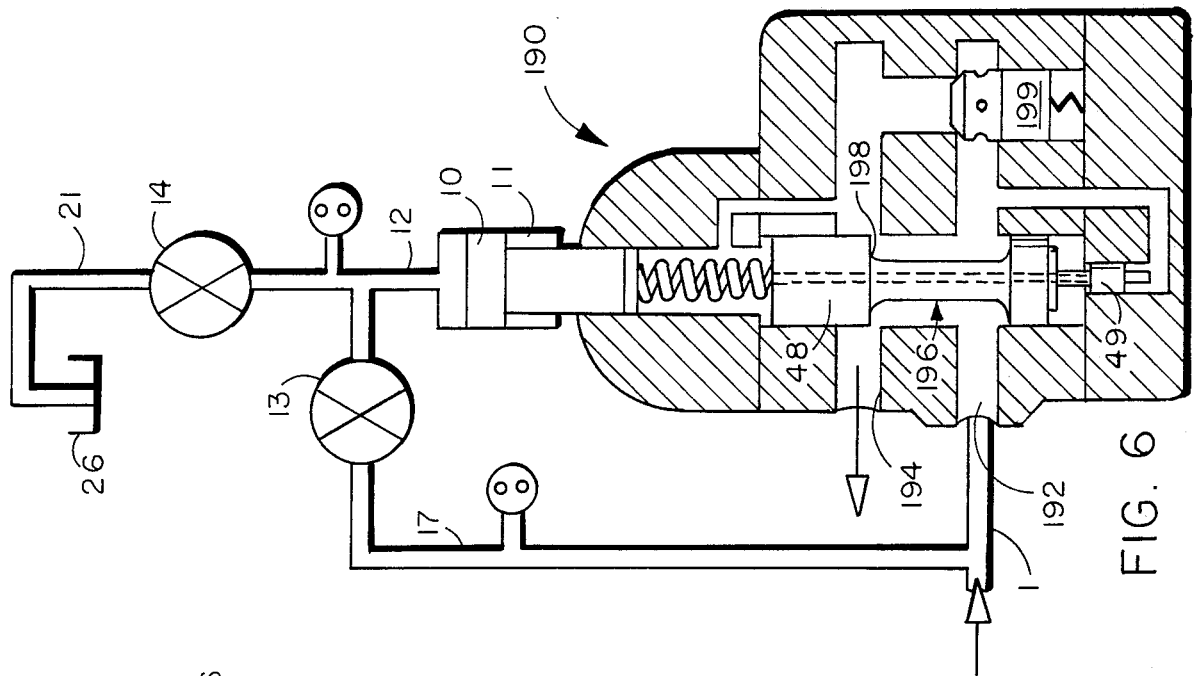
FIG. 6
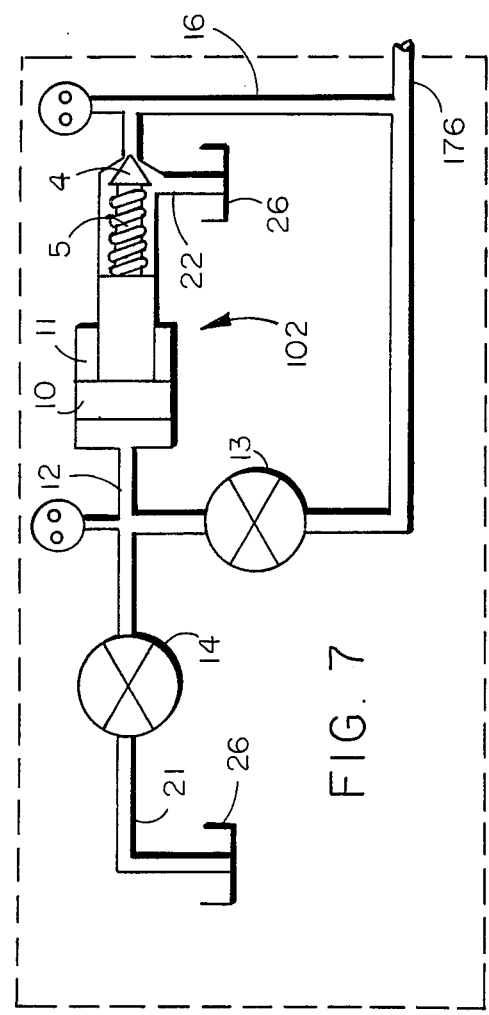
FIG. 7
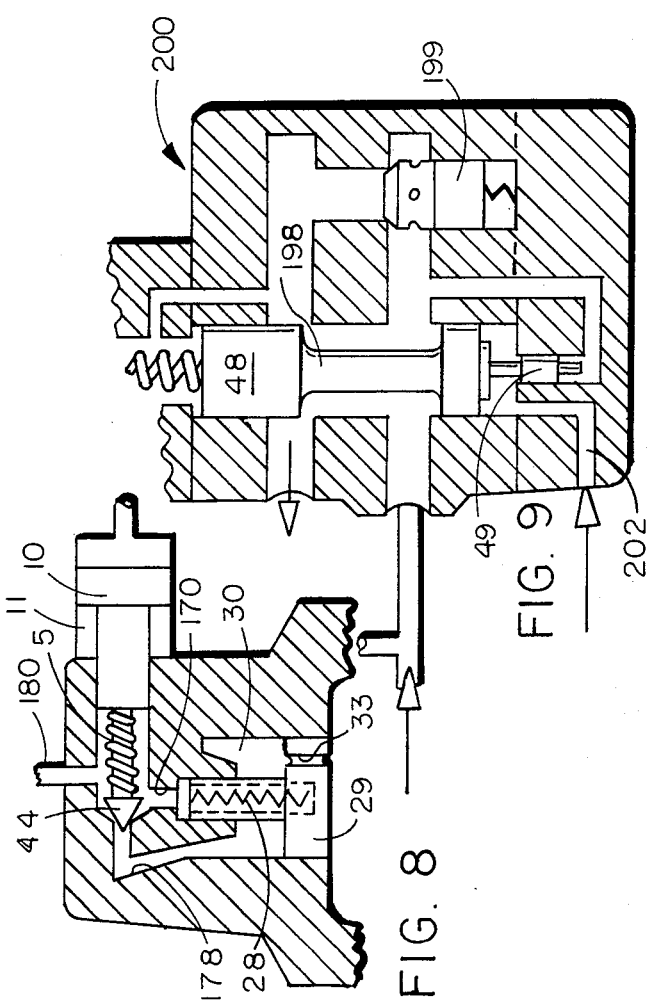
FIG. 8
FIG. 9

DIGITAL FLUID PRESSURE FLOW RATE AND POSITION CONTROL SYSTEM

BACKGROUND OF THE INVENTION

1. Field of the Invention

The present invention relates to a computer controlled fluidic pressure, flow rate or position control valve, especially a control valve for use in fluid flow systems requiring more than one fluid pressure level, flow rate or load position. The control system provides a control pressure flow rate or position in either a continuously variable fashion, or by effectuating pressure flow rate or position changes in sequential, discrete steps.

2. Description of the Prior Art

Numerous mechanical and electrical systems have been devised for controlling fluid flow in industrial and manufacturing environments. Fluid systems which require precise control are employed in numerous phases of industry, including the control of robots, the operation of presses for manufacturing rubber and plastic parts and for tensioning devices in the paper industry. The invention may also be used in mobile and nonmobile applications, in nuclear reactors, on aircraft and in missiles, and in petroleum refining operations, as well as in numerous other applications. In many of the industrial applications to which the invention is applicable, pressurized fluid is typically circulated from a high pressure source, through a load, and then exhausted to a low pressure supply or reservoir. It is highly important to precisely control and alter the amount of fluid flowing in such systems in order to achieve the desired results.

One very common system for controlling and altering fluid flow is through the use of a relief valve or system of relief valves. A relief valve is found in most fluidic systems. A relief valve is a normally closed valve connected between a pressure line and a reservoir. The purpose of the relief valve is to limit pressure in the system to a preset maximum by diverting some or all of the fluid flow from the high pressure line to a bypass line leading to a tank or other type of reservoir.

The simplest form of control of a relief valve is through a manual setting. That is, the volume of fluid flow through the bypass or relief line is adjusted simply by turning a knob which increases or decreases the orifice between a valve element, such as a poppet, and a valve seat leading to a bypass line to the tank. With the increased requirement for precision in modern industrial and processing operations, manually set relief valves are totally inadequate.

Due to the difficulties in achieving immediate and precision control of relief valves, some industrial systems employ multiple preset valves. In the conventional multiple valve system, several pressure valves are utilized. Directional valves are used to direct the system to "look" at these various pressure valves. Not only are such systems expensive, due to the repetition of components, but they also require excessive ducting and room to accomodate the multiple components. The considerable weight and size of this type of installation renders it impractical for many applications. Also, the engineering cost in designing such a system is quite high since extreme care must be taken to avoid the loss of efficiency due to the complexity of ducting.

In an attempt to avoid the problems and limitations associated with the multiple valve system, servo-type pressure control valves were designed. Typically the servo-valves were flapper type valves. The servo valve did eliminate the size and weight problems of the multiple pressure valve system, but sacrificed performance in doing so.

In a typical installation, the flapper nozzle type servo valve is an electrically modulated pilot to a compound pressure valve. The flapper is analogous to a poppet and seat with a spring type of control in that it is a force balanced system. When current is applied to the coil, the resultant magnetic force pulls the flapper toward the nozzle. This results in a smaller flow orifice and a buildup of pressure in the valve. The increased pressure produces a force which opposes the magnetic force and a balance is achieved with pressure being approximately proportional to the current applied. Because the coil used must be reasonably compact, the nozzle orifice must be small. The resulting effect is a fluid passage with a small cross sectional area capable of passing only very low volumes of fluid. In application, this severely restricts the speed of operation of the system. Commercially available valves of this type have a response time of approximately 250 milliseconds.

A further problem associated with this type of valve is that because of the narrow passages required, a high degree of filtration is necessary to prevent contamination that would otherwise block the passages and cause malfunctions. Also, because of the narrow passages, changes in fluid density inordinantly change the fluid flow characteristics and result in excessive fluid pressure fluctuations.

In servo-type pressure control valves the electrical analog signal necessary to vary the current of the coil is normally generated by a power supply. Generally the power supply contains a dither to eliminate inherent fluid stiction of the valve. The dither frequency capabilities of existing systems adversely affect the response time of the analog servo valve.

Typically conventional fluid flow control systems of the type described do not provide feedback to influence the fluid pressure. Accordingly, such systems do not compensate for thermal effects, amplifier drift, changes in ambient temperature or component aging. For many applications, these conventional fluid pressure control devices have proven unsatisfactory.

SUMMARY OF THE INVENTION

The present invention is a digital fluidic pressure amplifier and control system which employs digital computer control techniques for both continuous and variable control of pressure relief valves and related pressure control devices. The digital fluidic pressure amplifier is formed of a cylinder which houses a piston. The piston is coupled to a poppet by means of a spring or rigid shaft which, through the application of a control or pilot pressure, appropriately controls a supply pressure by controlling fluid flow through the poppet seat orifice in the relief valve. This flow through the relief valve orifice regulates the system pressure.

Control of the poppet in the valve is achieved by precisely controlling the piston which is coupled to the poppet. Fluid flow to position the piston is applied through digitally pulsed solenoid operated valves which respond to directives issued by a microcomputer controlled algorithm.

Operation of the solenoid actuated valves creates a fluid force which is applied to the control valve piston.

The control pressure required is dependent upon the amplifier area ratio. The amplifier area ratio is the area of the piston in the fluid control valve divided by the effective cross sectional area of the poppet. The amplifier area ratio establishes the static system pressure amplification factor.

System input pressure commands are controlled externally relative to the fluid control valve. A feedback signal from the fluid control valve is sensed by a digital computer and is used by the digital computer to generate control adjustments.

Within the digital computer there is a signal or pulse generating means which has electrical connections to a pressure enhancement solenoid associated with a pressure enhancement valve and to a pressure reduction solenoid associated with a pressure reduction valve. The pressure enhancement valve, when actuated, admits fluid under a high pressure into a control chamber or line which acts upon the surface of the fluid control valve piston. Actuation of the pressure enhancement valve will therefore result in an increase in pressure in the fluid control valve. The piston pressure in the fluid control valve, multiplied by the amplifier area ratio, is equivalent to the desired commanded supply pressure in the operating fluid supply line.

Conversely, the control pressure reduction valve is connected to a relief line which may be a drain or a tank return line leading to a low pressure fluid tank or reservoir. When the control pressure reduction valve is actuated, fluid flows from a control chamber or line in communication with the fluid control valve piston to a reduced pressure reservoir. This reduces pressure on the fluid control valve piston to alter the amount of fluid diverted from the operational fluid supply line through a bypass line to a lower pressure tank or reservoir.

The system employs closed loop operation. Feedback transducers are used to measure position, flow rate or pressure in the operational fluid supply line. One feedback transducer is positioned in the control fluid line or chamber. The signal from the control feedback transducer is numerically equal to the operation fluid supply line pressure divided by the amplification factor. The digital computer performs adjustments to the control pressure based upon feedback from the control or pilot pressure transducer because the response of those signals to changes in the control line is much more rapid and precise than corresponding changes in the operating fluid supply line. Nevertheless, a feedback signal is preferably also provided from the operating fluid supply line to provide a means for controlling flow rate and position.

In the closed loop operation of the system, an externally generated command control pressure signal and the actual control pressure feedback signal are both read by the microcomputer. The microcomputer calculates an error correction signal which is the difference between the feedback pressure and the command control pressure. The polarity of the error correction signal determines which of two solenoid operated valves is selected for actuation. The magnitude of the error correction signal determines the interval during which the selected valve is opened and governs the number of times the valve must be opened and reopened to bring the error correction signal to within a specified minimum threshold.

A positive error correction signal opens the pressure enhancement valve connected between the fluid operating line and the piston. A positive error control signal also ensures closure of a second valve which is a pressure reduction valve connected between fluid control valve piston and a drain or a relief line leading to a tank. Closure of the pressure reduction valve and opening of the pressure enhancement valve result in an increased pressure on the fluid control valve piston. This increased pressure on the piston forces the poppet closer to the control valve seat which results in a decreased orifice size. Increased resistance to flow at the orifice results in an increased fluid supply pressure in the fluid operating line. When the fluid supply pressure in the operating line rises to the level of the externally commanded pressure and the error correction signal falls to within the boundaries of an error correction threshold, the pressure enhancement solenoid valve is closed. With both the pressure enhancement and pressure reduction valves closed, a constant fluid pressure is maintained upon the piston. This pressure, multiplied by the ratio (amplification factor) of the piston area to the effective cross sectional area of the poppet is equal to the controled supply pressure in the operating line.

A negative error correction signal has the opposite effect. That is, a negative error correction signal opens the pressure reduction valve connected between the tank and the fluid control valve piston. This action reduces the pressure applied to the piston so that the pressure of the fluid diverted from the supply line forces the control valve poppet from its seat. This reduces the resistance to the diverted flow from the supply line, so that more fluid is diverted from the supply line and passes through the control valve orifice to a bypass line. Fluid flowing through the control valve orifice through the bypass line is returned to the tank. The pressure enhancement valve remains closed during this process.

In the preferred embodiment of the invention, an amplification factor is selected as a power of two, to facilitate the use of optimized software control algorithms which ensure minimum response time of the system. The response time of the preferred embodiment of the digitally controlled fluid flow system of the invention is typically 25 milliseconds. This response time is ten times faster than that which has heretofore been achieved. Amplification factors other than powers of two may be utilized, but their selection requires additional computer processing.

A further advantage of the present invention is the elimination of the strict requirements for filtration which have heretofore been necessary with servovalves. Unlike such prior art valves, orifice size is not limited by the size of a driving electrical coil. With the invention, an optimized control algorithm is used to properly select and pulse the appropriate pressure enhancement or pressure reduction solenoid operated valve in order to achieve the desired supply pressure in the operating line in response to the command control pressure. The preferred control algorithm is based upon a successive approximation method which employs a binary weighted test to determine proper valve pulse width.

Selection of the valve firing sequence is predicated upon whether the error correction signal is positive or negative. The error correction signal is determined by the algebraic difference of the desired or commanded pressure and the actual pressure in the operating supply line as sensed by a pressure feedback transducer in the chamber or line of the fluid control valve. Use of the feedback signal from the fluid control valve is preferable to use of a feedback signal directly from the operating supply line because the feedback signal from the control valve is generally more stable.

The error correction signal is digitally filtered based on a running averaging technique where the number of samples of the error correction signal to be averaged is binary weighted. A test is applied to the digitally filtered error correction signal to determine if the error correction signal is within a predefined threshold window around the null point of the error correction signal. This threshold window is employed to eliminate unnecessary firing of the pressure enhancement and pressure reduction valves which would otherwise detract from the system stability. If the error correction signal is outside the threshold boundaries, in either a positive or negative direction, a corresponding solenoid actuated valve is opened. Selection of the appropriate valve is based upon the polarity of the error correction signal.

A second binary weighted error signal is then determined based on a running average of the difference between the system command control pressure and the current supply pressure as sensed by the fluid control valve feedback transducer. Determination of the duration of the period during which the selected valve is opened is based upon a mathematical relationship between the error correction signal and the error signal. That is, once the selected valve has been fired the error correction signal which initiates the firing is held in computer memory and an error signal is iteratively computed and recomputed based on the feedback signal and the command control pressure signal. The selected valve is deactuated when the error signal diminishes to a predetermined portion of the error correction signal.

Preferably, the mathematical relationship which causes the selected valve to be deactuated is defined by the formula: $E_c/2^N = E$. Where N is an integer number, $E_c$ is the error correction signal and E is the error signal.

As an example, when $N=1$, the error signal is equal to or less than one-half of the initial error correction signal $E_c$. At that time the valve which was selected and opened by the error correction signal is then commanded to close. Although the error correction signal is stored unchanged in memory when the selected valve is opened, once the selected valve is deactuated the error correction signal is recalculated.

The foregoing process is repeated successively until the error correction signal is within the boundaries of the predetermined threshold. At that time the valve firings cease.

The principles of operation of the digitally controlled fluid flow system of the invention are applicable to all types of flow controls, variable speed pump controls and pressure relief valves, including both direct and pilot control of pressure relief valves, spool type relief valves, and other pressure control valves. Exemplary valves to which the principles of the invention are applicable include unloading, pressure reducing, brake type, sequence, counter balance valves, and unloading relief valves.

Although the fluid flow control system of the invention is described herein primarily in association with pressure relief valves, it is to be understood that the principles of operation are equally applicable to any fluid flow system in which fluid under high pressure flows to a region of lower pressure. Accordingly, the fluid flow control system of the invention is applicable to fluid processing applications, as well as fluid control applications.

In one broad aspect the invention may be considered to be an improvement in a fluid flow control system including a fluid control valve having a first port, a second port, a moveable closure element interposed therebetween and operated by fluid at a control pressure and in communication with the first port. The first port may be either the upstream or the downstream port relative to the fluid flow control system. According to the improvement of the invention, a control pressure enhancement valve is provided in flow communication with the first port. A control pressure reduction valve is provided in fluid communication with the control pressure enhancement valve and a relief line. A control pressure enhancement solenoid is coupled to operate the control pressure enhancement valve, and a control pressure reduction solenoid is coupled to operate a control pressure reduction valve. A signal generator is provided for selectively actuating the control pressure enhancement and control pressure reduction solenoids. The command signal source provides a command control pressure signal corresponding to a desired flow rate between the first and second ports. A control pressure feedback transducer is coupled in line between the control pressure enhancement and reduction valves to provide a feedback signal indicative of actual pressure in the line therebetween. Alternatively, a feedback transducer may be coupled in communication with at least one of the first and second ports to provide a feedback signal indicative of movement of fluid between the first and second ports. A comparator is coupled to receive and compare the command control pressure signal and the feedback signal to provide an error correction signal to the signal generating means. The error correction signal is dependent upon the magnitude of difference and indicative of the larger of the command control pressure signal and the feedback signal. The error correction signal thereby causes the signal generator to responsively select one of the solenoids and activate it for a period of time related to the magnitude of difference between the command control pressure signal and the feedback signal.

The invention has a particular advantageous applicability to pressure relief valve systems. The invention represents an improvement in such systems which have a flow inlet, a flow outlet, a flow bypass and a pressure relief valve means which diverts flow from the inlet to the flow bypass in a volume governed by the control pressure.

In such an application, the invention may be considered to include a control pressure enhancement valve coupled to the pressure relief valve and in flow communication with either the flow inlet or the flow outlet. A control pressure reduction valve is also provided and coupled between the pressure relief valve and a relief line which may be a drain or a return line to a reservoir. A pressure enhancement solenoid is coupled to operate the control pressure enhancement valve, and a pressure reduction solenoid is coupled to operate the control pressure reduction valve. A digitally activated signal generating means is provided for selectively actuating the pressure enhancement and pressure reduction solenoids. A command signal source provides a command control pressure signal corresponding to a desired flow rate from the inlet to the outlet. A feedback transducer is coupled to provide a feedback signal indicative of actual control pressure from the pressure relief valve. A digital comparator compares the control pressure signal and the feedback signal to provide a digital error correction signal to a signal generating means. The error correction signal is dependent upon the magnitude of difference and indicative of the larger of the command control pressure signal and the feedback signal. The signal generating means responsively selects one of the solenoids and actuates it for a period of time related to the magnitude of difference between the command control pressure signal and the feedback signal.

Preferably, the improvement of the invention includes a means coupled to the digital comparator for averaging consecutive samples of the digital command control pressure and feedback signals over a predetermined number of iterations to generate the digital error correction signal. The digital error correction signal is therefore preferably the arithmetic mean of differences between the digitized command control pressure and feedback signals.

Preferably also the fluid flow control system of the invention includes a signal terminating or deactuating means. The signal terminating means is coupled to the command signal source, the control pressure feedback transducer, and the signal generator to monitor the difference between the command control pressure signal and the feedback signal following activation of the signal generator. The signal terminating means deactivates the signal generator when the difference between the command control pressure signal and the feedback signal diminishes to a predetermined portion of the error correction signal.

Preferably, the signal terminating or deactuating means iteratively compares the command control pressure and feedback signals to produce an error signal, which is compared to the error correction signal. The error correction signal is temporarily stored in memory while the error signal is recomputed. As the error correction signal influences the flow control valve to bring the feedback signal closer to the command control pressure signal, the error signal will diminish.

In a preferred embodiment, the deactuating means also includes an averaging means for receiving the error signal and iteratively triggering the generation of a subsequent error signal. The deactuating means averages together a predetermined number of sequentially generated error signals, and thereafter treats the average of the predetermined number of error signals as a single error signal which is compared with the error correction signal. An average of several sequentially sampled error signals is a more reliable basis for comparison than a single error signal.

The system preferably also includes a threshold testing means which allows the digital comparator to activate the signal generating means only if the error correction signal achieves a predetermined threshold magnitude. This prevents the system from needlessly "hunting" for the correct control signal pressure when variations from that pressure are due only to very minor departures of the feedback signal from the command control pressure signal.

A further feature of the preferred embodiment of the invention is that the command control pressure signal is limited. This prevents the system from responding dangerously to a command control pressure which might be beyond the range of allowable command control pressures. It is possible for such a signal to be generated due to equipment failure or human error. To prevent this, a command control pressure signal limiting means is coupled to the digital comparator means to limit the value of the command control pressure signal to a predetermined maximum.

The invention may be described with greater clarity and particularity by reference to the accompanying drawings.

DESCRIPTION OF THE DRAWINGS

FIG. 6 illustrates a portion of an alternative embodiment of the invention employing a counter balance valve.

FIG. 7 illustrates a modification which can be coupled to the embodiment of the invention depicted in FIG. 2 for remote control of a compound relief valve.

FIG. 8 illustrates yet another modification to the embodiment depicted in FIG. 2.

FIG. 9 illustrates a modified form of the embodiment of FIG. 6 used as a digital fluidic controlled braking valve.

DESCRIPTION OF THE EMBODIMENTS

Figure 1:
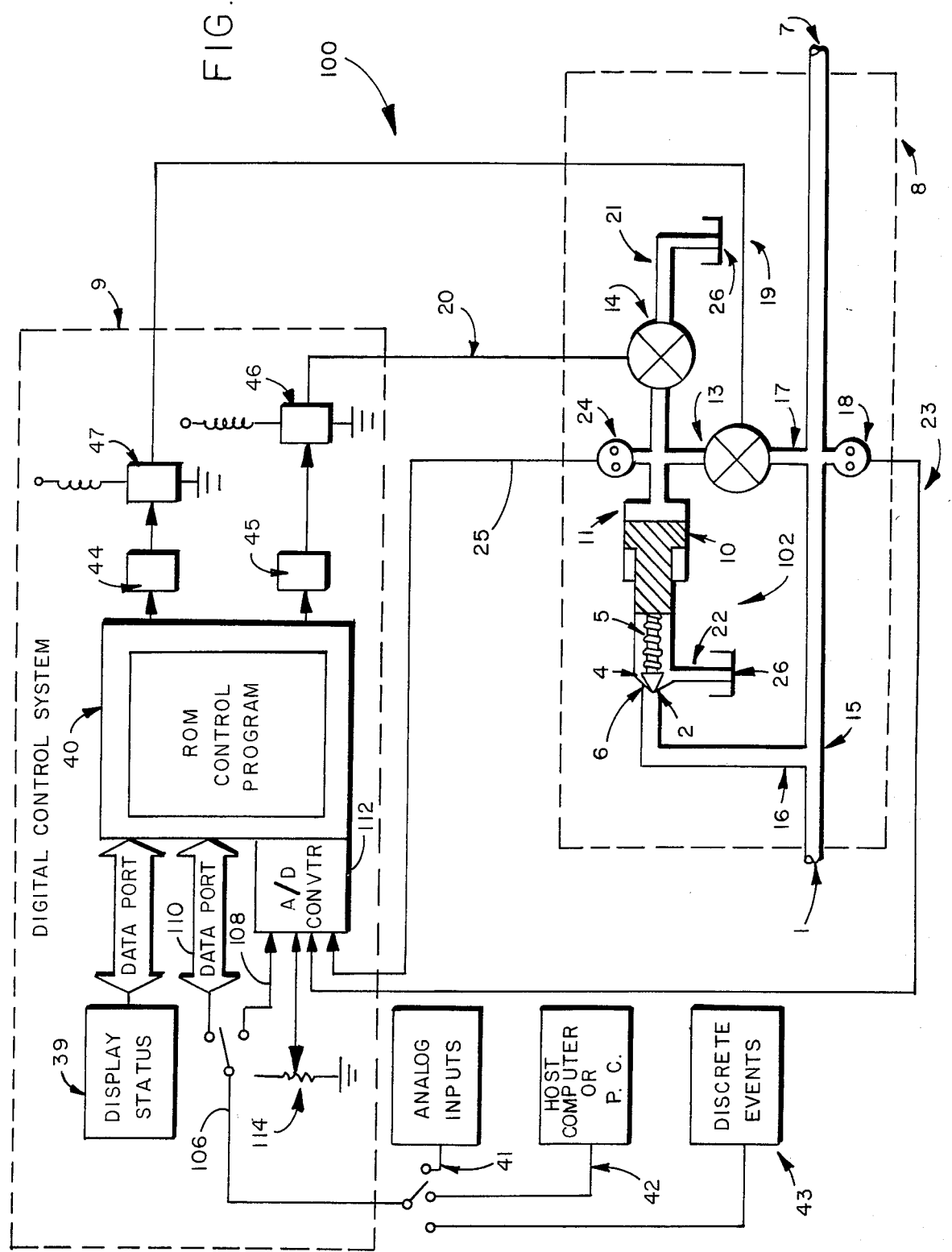
FIG. 1 is a block diagram of an embodiment of the digitally controlled fluid flow system of the invention which employs a simple relief valve.

FIG. 1 illustrates a digitally controlled fluid flow control system 100 which employs a digital fluidic amplifier, indicated generally at 8, and a digital control system 9. Together the amplifier 8 and control system 9 automatically adjust a pressure relief valve 102 with extreme accuracy and speed of response. The pressure relief valve 102 serves as a fluid control pressure amplification valve and is coupled to a fluid inlet line 1, a fluid outlet line 7, and a load bypass line 22. The pressure relief valve 102 defines a path leading from the inlet line 1, through a conduit 16 to a valve seat 6 which seats a moveable valve element in the form of a poppet 4. Together the poppet 4 and valve seat 6 form a controlled variable orifice 2 which leads to the bypass conduit 22 which in turn terminates at a reservoir tank 26.

A pilot or control pressure enhancement valve 13 is coupled to the relief valve 102 and in fluid communication with either the inlet line 1, the outline line 7, or both. A pilot or control pressure reduction valve 14 is coupled between the relief valve 102 and a fluid relief line 21 which leads to the tank 26.

A pressure enhancement solenoid 47 is coupled to operate the pilot or control pressure enhancement valve 13, and a pressure reduction solenoid 46 is coupled to operate the pilot or control pressure reduction valve 14. A digital computer 40, which may be a Motorola Model 6805R3 computer includes a digital pulse generator 104, depicted in FIG. 4. The digital pulse generator 104 is used to pulse the pressure enhancement and pressure reduction solenoids 46 and 47 with electronic signals of a controlled duration. A command signal source may take the form of an analog transducer, such as a potentiometer or other analog input depicted at 41, a host computer or programmable controller 42, or by a transducer 43 which responds to discrete events. In all modes of operation, the command signal source employed provides a first electrical signal indicative of a desired rate of fluid flow from the inlet line 1 to the outlet line 7.

A pilot or control pressure transducer 24 is coupled to provide a second or feedback signal indicative of pilot or control pressure between the pressure enhancement valve 13 and the pressure reduction valve 14 and the relief valve 102. The computer 40 serves as a signal processing means for comparing the first and second electrical signals on lines 106 and 25, respectively, and provides an error correction signal on line 140 in FIG. 4. The error correction signal on line 140 depends upon the difference in the first command control pressure signal on line 106 (FIG. 1) and the second feedback signal on line 25 (FIG. 1). The pulse generator 104 responds to the error correction signal on line 140 to pulse a selected one of the pressure enhancement and pressure reduction solenoids 47 and 46, respectively, for a corresponding duration of time.

Together the fluidic amplifier 8 and the digital control system 9 accurately position the poppet 4 into the valve seat 6 to form a controlled, variable orifice 2. Positioning of the poppet 4 is achieved by precisely regulating the fluid applied to the piston 10 contained in the cylinder 11 of the relief valve 102. The piston 10 is coupled to the poppet 4 by means of either a spring or a rigid shaft 5.

A controlled amount of fluid is applied to the cross sectional area of the piston 10 to create a controlled force on the poppet 4. This controlled force positions the poppet 4 relative to the valve seat 6. The distance between the poppet 4 and the valve seat 6 determines the size of the orifice 2. When the poppet 4 is positioned into the seat 6, entirely closing the orifice 2, the total fluid flow in the inlet line 1 is delivered to the fluid outlet or load line 7. When the poppet 4 is moved off of the valve seat 6, thereby increasing the size of orifice 2, flow is diverted through the orifice 2 and returned to the tank 26 through the bypass conduit or line 22. Resistance to fluid flow through the orifice 2 establishes the system supply pressure which is directed to load 7. The resistance to fluid flow through the orifice 2 is determined by the cross sectional area of the orifice 2. The magnitude of the force created at the orifice 2 is established by the ratio of the area of the piston 10 divided by the effective cross sectional area of the poppet 4. This relationship is defined as the pressure amplification factor.

The controlled pressure applied to the piston 10 multiplied by the amplification factor establishes the desired supply pressure PS. With zero pressure on piston 10, resistance to fluid flow through the orifice 2 through the bypass line 22 to the tank 26 is established at a minimum system supply pressure.

Figure 5:
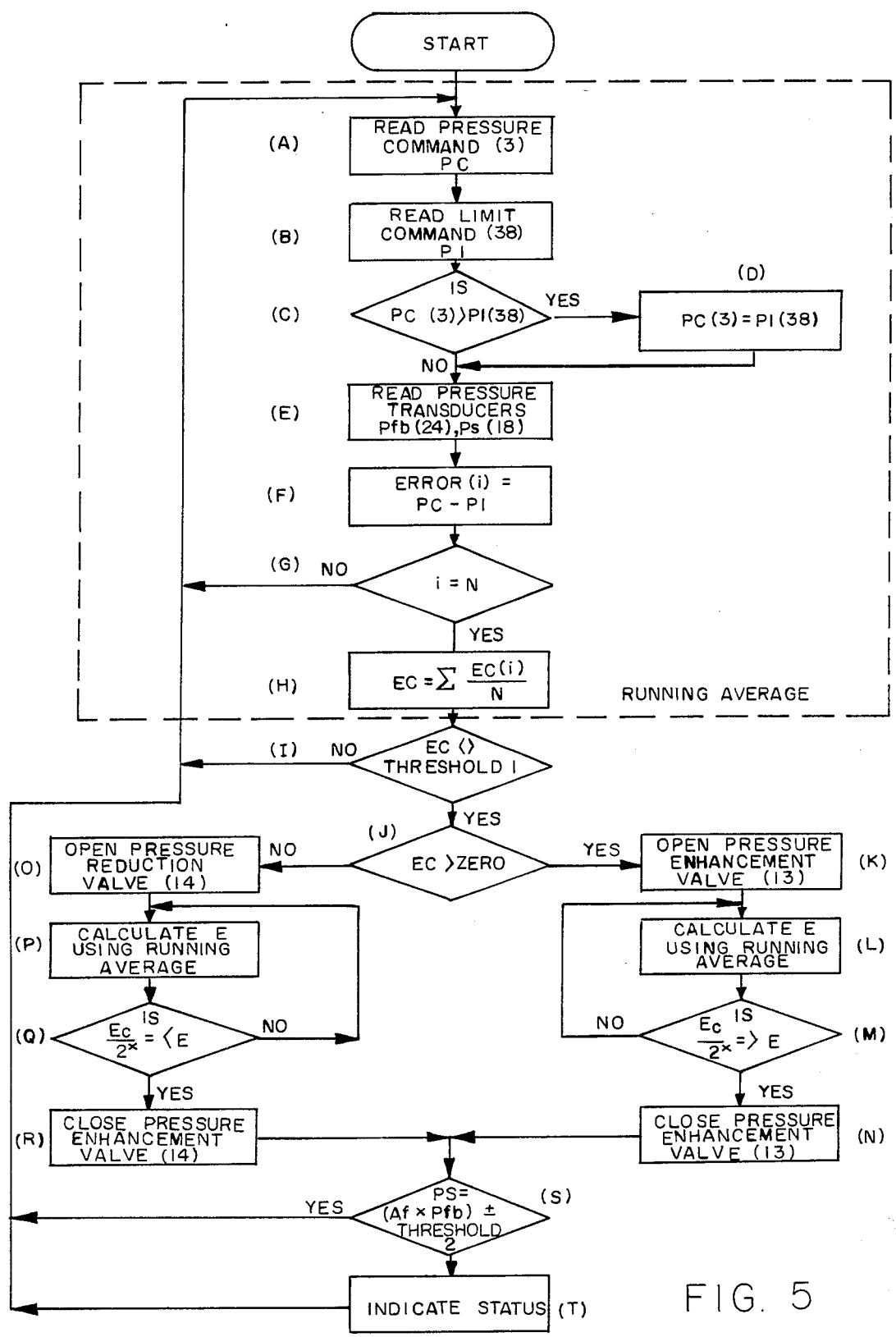
FIG. 5 is a flow diagram depicting the operation of the digital logic of the fluid flow control system of FIG. 1.

The actual control pressure in the conduit 12 coupled to the cylinder 11 is maintained by digitally pulsing the pressure enhancement and pressure relief valves 13 and 14, respectively through a closed loop control sequence by a microcomputer based digital control system 9. The flow chart for the digital control is illustrated in FIG. 5.

To increase system supply pressure PS to load outlet line 7, the pressure enhancement valve 13 is opened for a controlled time period which is determined by the digital control system 9. When the pressure enhancement valve 13 is opened and the pressure reduction valve 14 is closed, fluid flow through the conduit 17 exerts a fluid force on the piston 10. This force advances the poppet 4 into the valve seat 6 to decrease the cross sectional area of the orifice 2. This results in increased resistance to fluid flow through the orifice 2 and increases the system supply pressure PS.

Conversely, a reduction in supply pressure PS is achieved by closing the pressure enhancement valve 13 and opening the pressure reduction valve 14. This results in fluid flow through the conduit 21 to the tank 26, thereby reducing the fluid force in the line 12 on the piston 10. As a result, the poppet 4 moves away from the valve seat 6 and decreases the resistance to fluid flow through the orifice 2. An increase in the flow from the conduit 16, through the orifice 2 to the bypass line 22 and then to the tank 26 thereby decreases the system supply pressure PS.

A constant supply pressure PS may be maintained by closing both the pressure enhancement valve 13 and the pressure reduction valve 14. With both of these valves closed, the actual command or pilot pressure in the coupling line 12 remains constant and exerts a constant force on the piston 10. As a result, the poppet 4 is held in a stationary position. The size of the orifice 2 remains constant, as does the system supply pressure PS.

Supply pressure PS is sensed directly by the pressure transducer 18. The supply pressure PS is sensed indirectly by the feedback transducer 24 which provides a feedback signal on the line 25. The feedback signal on line 25 is directly proportional to the supply pressure PS between inlet line 1 and outlet line 7.

Control of the system supply pressure PS is achieved by the closed loop microcomputer based digital control system 9. The digital control system 9 senses the electrical signal on line 25 from the pressure transducer 24, as well as an external pressure command signal on line 106. If the signal on line 106 is derived from the host computer or programmable controller 42, it will be a digital signal and will be transmitted to the data port 110 by means of a switch 3. The output of a discrete event transducer 43 may be either digital or analog. If it is digital, it, likewise, is transmitted to the data port 110 through the switch 3. If the discrete event is an analog signal, it is transmitted on line 108 through an analog to digital converter 112 to the computer 40.

It may be desirable to provide a limit signal source which may take the form of a potentiometer 114. The potentiometer 114 provides a limit signal on line 38 to the signal processing circuitry in the computer 40. This limit signal is indicative of an upper allowable limit of the command control pressure signal on line 106.

Figure 4:
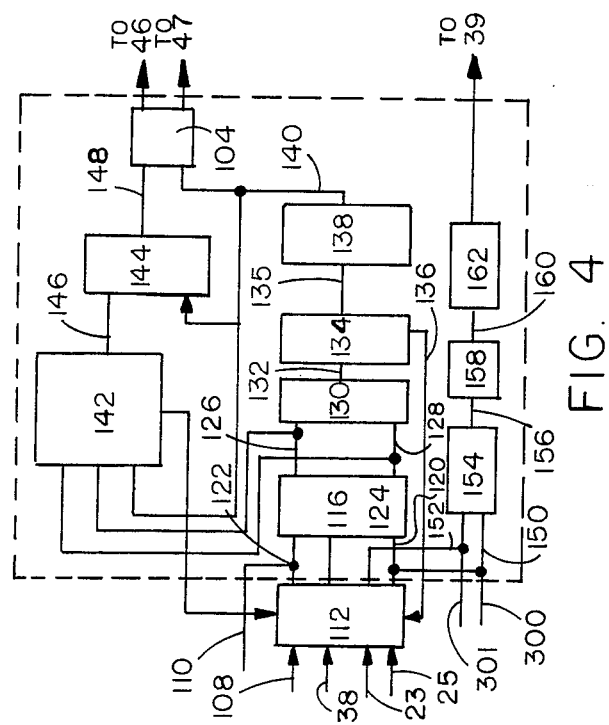
FIG. 4 is a functional block diagram of the digital signal processing circuitry and the pulse generating circuitry of the embodiment of FIG. 1.

FIG. 4 illustrates a functional block diagram of the signal processing and pulse generating circuitry of the invention. It is to be understood that with a digital computer 40, the signal processing circuitry forming a part of the computer will perform a multiplicity of functions which are indicated as separate functional elements in FIG. 4.

For most applications at least some of the signals directed to the signal processing circuitry are analog in nature. Accordingly, an analog to digital converter 112 is provided to convert any analog signals to digital signals. The analog to digital converter 112 converts the analog command control pressure signal 108 to a digital form and transmits this digitized signal on line 122. Similarly, the analog to digital converter 112 converts the analog limit signal on line 38 to a digital signal on line 124 The analog feedback signals on lines 23 and 25 are likewise respectively converted to digital signals on lines 152 and 150, respectively. For applications where the signals directed to the signal processing circuitry are digital in nature, the command control signal 106 is provided on data port 110 to line 122 directly. If the feedback signals on lines 23 and 25 are digital in nature, they are provided on lines 300 and 301 respectively to lines 152 and 150 respectively.

The computer 40 serves as a means for comparing the command control pressure signal transmitted on line 122 and the limit signal on line 124. The limit signal on line 124 establishes an upper allowable limit of the command control pressure. The comparator 116 provides the smaller of the signals on lines 122 and 124 as an output on line 126. The output on line 126 is thereafter treated as the first or command control pressure signal. The feedback signal is passed through the comparator 116 and appears as an output on line 128.

The computer 40 also serves as a digital comparator 130 coupled to receive and compare the command control pressure signal on line 126 and the feedback signal on line 128. The comparator 130 provides an error correction signal on line 132. The error correction signal on line 132 is directed to a circuit 134 which functions as an averaging means. The averaging circuit 134 receives the error correction signal on line 132 and iteratively triggers the generation of a subsequent error correction signal by means of a triggering signal on line 136. The averaging circuit 134 counts each new error correction signal as it is received and averages together a predetermined number of sequentially generated error correction signals. The averaging circuit 134 thereafter treats the average of the predetermined number of sequentially generated error correction signals as the error correction signal and transmits the error correction signal as an output on line 135.

The computer 40 also serves as an error correction signal comparator 138 to compare the error correction signal received on line 135 with a threshold value. The comparator 138 suppresses transmission of the error correction signal to the pulse generator 104 when the error correction signal is smaller than the threshold value. If the error correction signal achieves or exceeds the threshold value, it is transmitted to the pulse generator on line 140.

The error correction signal 140 is also processed by the computer 40 which serves as a deactuating means and which functions as an averaging means or a digital calculating means, depicted at 142 in FIG. 4. As a deactuating or digital calculating means 142, the computer 40 receives the error correction signal on line 140 and thereafter iteratively samples the feedback signal from line 128 and the command control pressure signal from line 126. The averaging circuit 142 iteratively compares these signals to produce an error signal on line 146. The averaging means 142 iteratively triggers the generation of sequential error signals and averages together a predetermined number of sequentially generated error signals from line 140. The average of the error signals is thereafter treated as a single error signal and is thereafter processed by the computer 40 which then serves as a comparison circuit 144.

The comparison circuit 144 iteratively compares the error signal on line 146 with the error correction signal on line 140 and deactuates the pulse generating means by a signal on line 148 when the error signal diminishes to a predetermined portion of the error correction signal.

The computer 40 also serves as a means for storing a predicted proportional relationship between the feedback signal from the control or pilot pressure line 16 and the signal on line 23 representing the supply line pressure PS. The computer 40 applies the proportional relationship to either the feedback signal received on line 150 or to the signal from the transducer 24, received on line 152. The computer 40 then compares the scaled signal to the other of these two signals. These storage and comparison functions are indicated at 154 in FIG. 4. Once the comparison has been performed, the circuit 154 transmits a signal on line 156 indicative of any inequivalence of the scaled signal and the other of the signals from the transducers 18 and 24. The block 158 in FIG. 4 indicates the function of storing a tolerance value and as a means for suppressing the indication of inequivalence between the scaled signal and the other signal if the extent of inequivalence is less than the tolerance level. If the inequivalence exceeds the tolerance level, a signal is passed at 160 to an alarm driving circuit 162. The alarm provided may be in the form of a visual indication which may be displayed in the visual display 39, depicted in FIG. 1.

Also, as depicted in FIG. 1, the pressure enhancement valve 13 is controlled by the application of digitally pulsed signals on line 19 from the pressure enhancement solenoid 47 connected to the computer 40 through an optical isolator 44. Similarly, the pressure reduction valve 14 is controlled by the application of digitally pulsed signals on line 20 from the output solenoid driver 46 connected to the computer 40 by the optical isolator 45.

The software control algorithm and program is stored in read only memory in the computer 40. The operation of the program is best described with reference to FIG. 5.

Upon system initialization, the computer based digital control system 9 samples the command control pressure from line 106, the limit signal on line 38 from the potentiometer 14, the feedback signal from transducer 24 on line 25, and the operating supply line pressure signal from tranducer 18 on line 23. Decision C in FIG. 5 and the statement D are steps for testing for adherence to the system pressure limit. By performing these steps the computer 40 ensures that no control pressures are commanded which are beyond the operating range of the digital fluidic amplifier 8.

Calculation of the error correction signal occurs at Step F. The signal derived from Step F in FIG. 5 represents unfiltered data. Decision G represents a count to determine the number of samples of the feedback signal and command control pressure which are processed to provide an average error correction signal. That is, "N" is equal to the number of times the feedback signal and command control pressure signal are compared to provide the error correction signal, and the number of error correction signals which are averaged together. Preferably, "N" is a power of two to be included in the running average calculation of a filtered error signal performed in accordance with Step H.

If the filtered error signal $E_c$ is within some predetermined threshold 1 as determined in Decision I, no action is taken. In that case, the system resumes testing of the feedback and command control pressure signals. If, on the other hand, the filtered error signal $E_c$ is outside of threshold 1, the polarity of the error signal $E_c$ is tested by Decision J to determine the selection of pressure enhancement valve 13 or pressure reduction valve 14. A positive error signal $E_c$ will cause execution of Step K to open the pressure enhancement valve 13.

At this point in the control logic, a second and distinct error signal E is calculated in accordance with Step L. The calculation of error signal E is in essentially the same manner as the error signal $E_c$. That is, the command control pressure signal and the feedback signal are repetitively sampled and compared to produce an error signal. This sampling is performed iteratively a predetermined number of times which may or may not be the same number "N" indicated in Step G.

Once an average error signal has been calculated in accordance with Step L, it is compared with a predetermined portion of the error correction signal $E_c$. This predetermined portion is the fraction $1/2^X$, where X is a positive integer. If the error correction signal $E_c$ divided by $2^X$ is not greater than or equal to the error signal, as determined by the test of Step M, a new error signal E is calculated according to Step L. Thus, the pressure enhancement valve 13 will remain open, thereby increasing pressure in the conduit 12 until the error signal E diminishes to no greater than the value of the error correction signal $E_c$ divided by $2^X$. The value of the error correction signal $E_c$ remains constant throughout Steps K, L and M in FIG. 5.

Once the error signal E has diminished sufficiently, the pulse generator is turned off, the pressure enhancement solenoid 47 is released, and the pressure enhancement valve 13 closes.

A negative error correction signal $E_c$ results in the performance of Steps O through R which correspond directly with Steps K through N in FIG. 5.

A system status test S is made by comparing the operating line pressure sensed by the pressure transducer 18 with the actual control pressure sensed by the pressure transducer 24 multiplied by the amplification factor plus or minus a predetermined threshold or tolerance denoted as threshold 2. If the two pressures sensed by the microcomputer based digital control system 9 are not equivalent, an indication of that status is presented at Step T on the status display 39 in FIG. 1 before the control sequence recycles to start.

The iterative application of Steps A through S in FIG. 5 represents a successive approximation technique to optimize convergence time between supply pressure PS as sensed by the operating supply line pressure transducer 18 and the external input command pressure on line 106.

Figure 2:
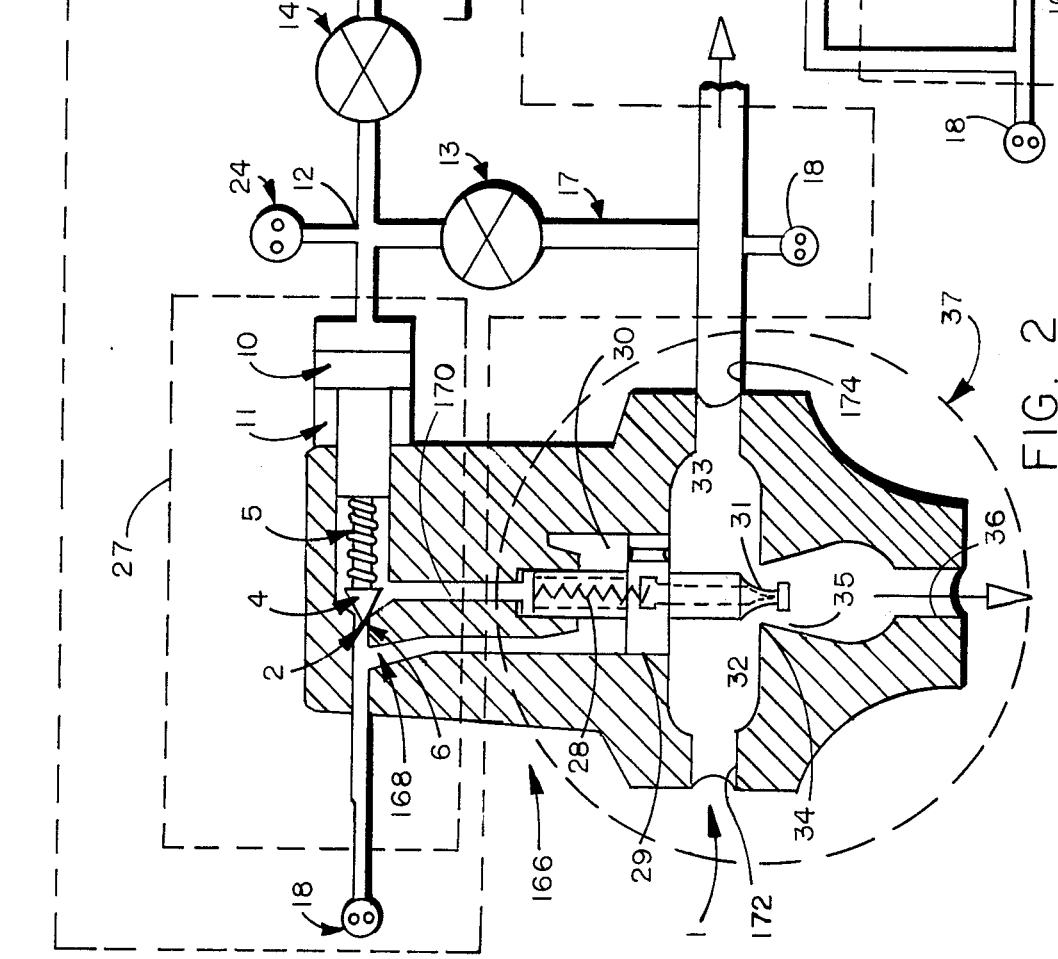
FIG. 2 is a block diagram of a portion of an alternative embodiment of the system employing a compound pressure relief valve.

FIG. 2 shows the control system of the invention applied to a different type of pressure relief valve. Many of the devices and structural elements present in the digital fluidic amplifier 8 of FIG. 1 are also present in the embodiment depicted in FIG. 2 and are indicated by the same reference numbers. The same digital control system 9 of FIG. 1 is employed in the embodiment of FIG. 2, and the interconnections therewith to the transducers 18 and 24 and the pressure enhancement and reduction valves 13 and 14 are identical. Likewise, elements which have been described in association with FIG. 1 and which appear in FIGS. 3 and 6 through 9 are likewise identically numbered.

The pressure relief valve depicted in FIG. 2 is indicated generally at 166. The pressure relief valve 166 is a compound pressure relief valve. The compound relief valve 166 operates in two stages. The pilot stage 27 in the upper valve body contains the pressure limiting valve controlled by the digital fluidic control system of the invention. A poppet 4 is held against a seat 6 by spring force applied through a piston 10. The force created on the piston 10 is generated and controlled in a similar manner as described for the control of the simple relief valve shown in FIG. 1.

Fluid porting connection 168 and the bypass line 170 are made to the lower valve body 37. Diversion of a portion of the flow volume from the inlet port 172 to the outlet port 174 is accomplished by the balanced piston 29 in the lower valve body 37.

The balanced piston 29, in operation, is in a fluidic balance condition. Pressure at the inlet port 172 acts on the underside of the piston 29, and is also sensed on the top surface of the piston 29 in the chamber 30 by means of an orifice 33 which is drilled through the balanced piston 29. The balanced piston 29 is biased downwardly by a light spring 28.

When the pressure in the chamber 30 reaches that established by the digital fluidic amplifier formed by the upper pilot section 27, the poppet 4 is forced off its seat thereby limiting pressure in the chamber 30. The restricted flow through the orifice 33 into the upper chamber 30 results in an increase in pressure in the lower chamber 32. This unbalances the hydraulic forces and tends to raise the balanced piston 29 off of its seat 34, when the difference in pressure between the upper chamber 30 and the lower chamber 32 is sufficient to overcome the force of the light spring 28.

At this time the balanced piston face 31 unseats from the valve seat 34, thereby diverting some or all of the flow coming in through the inlet port 172 through a bypass outlet 36 to a tank. The bypass flow through the bypass conduit 36 reduces pressure at the outlet port 174. An increase in pressure in conduit 12 will have the opposite effect. That is, an increase in pressure in conduit 12 will push the poppet 4 toward the valve seat 6, thus creating a pressure buildup in chamber 30 which will force the piston 29 downward. This will close or restrict the bypass conduit 36.

Figure 3:
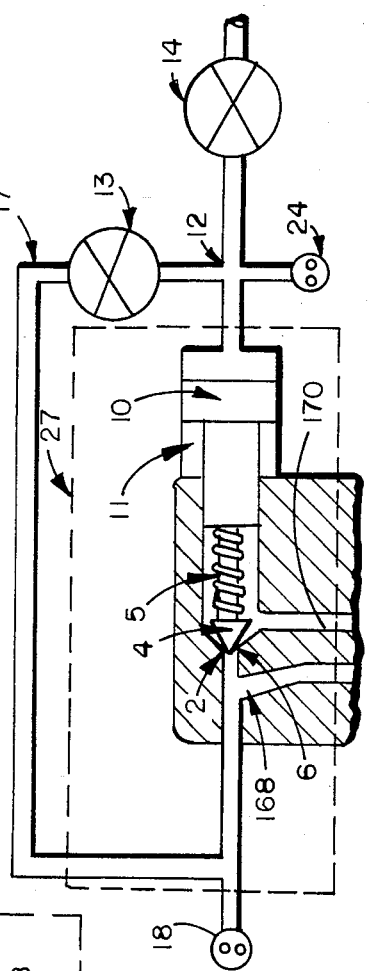
FIG. 3 illustrates a portion of a modification of the embodiment of FIG. 2.

The control pressure for the digital fluidic amplifier of the invention may be obtained from either the operating fluid line inlet or outlet, as shown in FIG. 2, or from the vent port 168, as illustrated in FIG. 3. The supply transducer 18 may be positioned either in communication with the outlet port 174, as depicted in FIG. 2, or in communication with the vent port 168 as illustrated in FIG. 3.

It is to be understood that the concept of the invention is applicable to numerous other relief valve configurations. For example, the control system of the invention is applicable to digital fluidic pressure control systems used for remote pilot control of compound pressure relief valves. For example, the upper pilot section 27 of FIG. 2 could be modified by replacing the fluidically controlled poppet 4 with a fixed or manually adjusted poppet. The control system of the invention could then be applied to a remotely located valve 102, as depicted in FIG. 7, with the conduit 176 coupled to the vent port 168 of the compound relief valve of FIG. 2, modified according to FIG. 3. The digitally controlled fluid flow system would operate in all respects as described in conjunction with FIGS. 1, 4 and 5. The control pressure for the digital fluidic amplifier can be obtained from the vent port 168 of the compound relief valve, as would be the case if conduit 176 of FIG. 7 were coupled to conduit 168 of FIG. 3. Alternatively, the control pressure could be derived from either the operating fluid line inlet or outlet.

FIG. 8 illustrates the embodiment of a two stage sequence valve. In FIG. 8 the vent port 178 is internal within the valve housing, and the bypass line 180 is coupled to a relief path.

FIG. 6 illustrates the application of the digitally controlled fluid flow system of the invention to a controlled counter balance valve. The valve 190 of FIG. 6 has a primary port 192 and a secondary port 194. The counter balance valve 190 differs from the other types of valves described in that the flow may be freely reversed between the ports 192 and 194. The moveable valve element 196 is a sliding spool type structure. Operating pressure sensed by the piston 49 opposes the force created through the digital fluid control system of the invention. The piston 49 moves the spool 48 thereby porting all or part of the supply fluid flow through the orifice 198 to the secondary port 194, thus regulating system pressure. The amplification factor is established by the ratio of the cross sectional areas of the pistons 10 and 49.

FIG. 9 illustrates a variation of the valve of FIG. 6. The valve 200 of FIG. 9 includes a remote control pilot pressure supply line 202. The valve 200 is applicable for use as a braking valve. The locations of the interconnections to the digital control system in the modification of FIG. 9 correspond to those depicted in FIG. 6.

Undoubtedly, numerous other variations and modifications of the invention will become readily apparent to those familiar with pressure relief valves and other fluid control systems. Accordingly, the scope of the invention should not be construed as limited to the specific embodiments depicted and described, but rather is defined in the claims appended hereto.

We claim:

1. In a fluid pressure control system including a flow control pressure amplification valve having a first port, a second port, a moveable closure element interposed therebetween operated by fluid at a control pressure and in communication with said first port, the improvement comprising a relief line, a control pressure enhancement valve in flow communication with said first port and with said pressure amplification valve, a control pressure reduction valve in fluid communication with said control pressure enhancement valve, said pressure amplification valve and said relief line, a control pressure enhancement solenoid coupled to operate said control pressure enhancement valve, a control pressure reduction solenoid coupled to operate said control pressure reduction valve, a command signal source for providing a digital command control pressure signal corresponding to a desired flow rate between said first and second ports, a control pressure feedback transducer coupled in line between said control pressure enhancement and reduction valves to provide a feedback signal indicative of actual pressure at said control pressure enhancement and control pressure reduction valves of a magnitude amplified by said pressure amplification valve to a factor greater than one for enhanced sensitivity, and electronic digital control means which receives said command control pressure signal and said feedback signal and responsively selects one of said solenoids to provide thereto an error correction signal of duration controlled in accordance with the magnitude of initial difference between said command control pressure signal and said feedback signal and a predicted time at which said difference will approach zero, as determined by iterative resampling of said difference and comparison thereof with a predetermined portion of said initial difference.

2. A fluid pressure control system according to claim 1 in which said electronic digital control means is arranged to iteratively and repetitively sample said command control pressure signal and said feedback signal to produce an error signal, to compare said error signal with a predetermined fraction of said error correction signal, and to terminate the provision of said error correction signal once said error signal diminishes to no greater than said predetermined fraction of said error correction signal.

3. A digitally controlled fluid flow control system comprising:
a fluid inlet line,
a fluid outlet line,
a load bypass line,
a flow control pressure amplification valve means coupled to said fluid inlet line and defining a path leading therefrom to said load bypass line,
a pilot pressure enhancement valve, coupled to said flow control pressure amplification valve means and in fluid communication with one of said fluid inlet and outlet lines,
a pilot pressure reduction valve means coupled between said flow control pressure amplification valve means and said load bypass line,
a pressure enhancement solenoid coupled to operate said pilot pressure enhancement valve,
a pressure reduction solenoid coupled to operate said pilot pressure reduction valve,
a command signal source for providing a digital command control pressure signal corresponding to a desired flow rate between said first and second ports,
a control pressure feedback transducer coupled in communication with said flow control pressure amplification valve means and said control pressure enhancement and reduction valves to provide a feedback signal of a magnitude amplified by said pressure amplification valve to a factor greater than one for enhanced sensitivity and indicative of actual pressure at said flow control pressure amplification valve means,
an electronic digital control means for receiving said command control pressure control signal and said feedback signal, wherein said electronic digital control means is arranged to responsively select one of said solenoids and to provide thereto an error correction signal of duration controlled in accordance with the magnitude of initial difference between said command control pressure signal and said feedback signal and a predicted time at which said difference will approach zero, as determined by iterative resampling of said difference and comparison thereof with a predetermined portion of said initial difference.

4. A digitally controlled system according to claim 3 wherein said electronic digital control means is arranged to iteratively and repetitively sample said command control pressure signal and said feedback signal to produce an error signal, to compare said error signal with a predetermined fraction of said error correction signal, and to terminate the provision of said error correction signal once said error signal diminishes to no greater than said predetermined fraction of said error correction signal.

5. In a pressure relief valve system having a flow inlet, a flow outlet, a flow bypass, and a flow control pressure amplification relief valve means which diverts flow from said inlet to said flow bypass in a volume governed by a control pressure, the improvement comprising a control pressure enhancement valve coupled to said pressure amplification relief valve means and in flow communication with one of said flow inlet and said flow outlet, a control pressure reduction valve coupled to said pressure amplification relief valve means and in flow communication with said flow bypass, a pressure enhancement solenoid coupled to operate said control pressure enhancement valve, a pressure reduction solenoid coupled to operate said control pressure reduction valve, a command signal source for providing a digital command control pressure signal corresponding to a desired flow rate between said flow inlet and said flow outlet, a control pressure feedback transducer coupled in communication with said pressure amplification relief valve means and said control pressure enhancement and reduction valves to provide a feedback signal indicative of actual pressure thereat, an electronic digital control means for receiving said command control pressure signal and said feedback signal to responsively select one of said solenoids and to provide thereto an error correction signal of duration dependent upon the magnitude of initial difference between said command control pressure signal and said feedback signal.

6. A digitally controlled fluid flow control system according to claim 5 in which said electronic digital control means is arranged to iteratively and repetitively sample said command control pressure signal and said feedback signal to produce an error signal, to compare said error signal with a predetermined fraction of said error correction signal, and to terminate the provision of said error correction signal once said error signal diminishes to no greater than said predetermined fraction of said error correction signal.

7. A digitally controlled fluid flow control system comprising:
a fluid inlet line,
a fluid outlet line,
a load bypass line,
a flow control pressure amplification valve means coupled to said fluid inlet line and defining a path leading therefrom to said load bypass line,
a pilot pressure enhancement valve coupled to said flow control pressure amplification valve means and in fluid communication with one of said fluid inlet and outlet lines,
a pilot pressure reduction valve coupled between said flow control pressure amplification valve means and a fluid relief line,
a pressure enhancement solenoid coupled to operate said pilot pressure enhancement valve,
a pressure reduction solenoid coupled to operate said pilot pressure reduction valve,
digital pulse generating means for pulsing said pressure enhancement and pressure reduction solenoids with electronic signals of a controlled duration,
a command signal source for providing a first electrical signal indicative of desired rate of fluid flow from said inlet line to said outlet line,
a pilot pressure transducer coupled to provide a second signal of a magnitude amplified by said pressure amplification valve to a factor greater than one for enhanced sensitivity and indicative of pilot pressure between said pressure enhancement and reduction valves and said flow control pressure amplification valve means,
signal processing means for comparing said first and second electrical signals and for providing an error correction signal dependent upon the difference between said first and second signals to said pulse generating means to pulse a selected one of said pressure enhancement and pressure reduction solenoids for a corresponding duration of time,
a load pressure transducer coupled to said signal processing means to provide a third electrical signal indicative of actual load supply pressure from said inlet line to said outlet line,
means in said signal processing means for storing a predicted proportional relationship between said second and third signals,
means in said signal processing means for applying said proportional relationship to one of said second and third signals to produce a scaled signal and for comparing said scaled signal to the other of said second and third signals, and
means for providing an indication of inequivalence of said scaled signal and said other signal.

8. A digitally controlled fluid flow system according to claim 7 further comprising means for storing a tolerance value and means for suppressing the indication of inequivalence between said scaled signal and said other signal if the extent of inequivalence is less than said tolerance level.

9. A digitally controlled fluid flow system according to claim 3 further comprising a limit signal source to provide a limit signal to said electronic digital control means indicative of an upper allowable limit of said feedback signal, and means for comparing said digital command control pressure signal with said limit signal and for providing the smaller thereof as said command control pressure signal.

10. A digitally controlled fluid flow system according to claim 3 wherein said electronic digital control means is arranged to compare said error correction signal with a threshhold value and to suppress transmission of said error correction signal to said pressure enhancement and pressure reduction solenoids when said error correction signal is smaller than said threshhold value.

11. A digitally controlled fluid flow system according to claim 3 wherein said electronic digital control means, upon providing said error correction signal, iteratively triggers the generation of subsequent error correction signals and averages together a predetermined number of sequentially generated error correction signals and thereafter treats the average of said predetermined number of sequentially generated error correction signals as said error correction signals.

12. A digitally controlled fluid flow system according to claim 3 in which said electronic digital control means iteratively samples and compares said digital command pressure signal and said feedback signal to produce an error signal representing the difference therebetween, and iteratively compares said error signal with said error correction signal and deactivates said pressure enhancement and pressure reduction solenoids when said error signal diminishes to a predetermined portion of said error correction signal.

13. A digitally controlled fluid flow system according to claim 12 in which said electronic digital control means iteratively triggers the generation of sequential error signals, averages together a predetermined number of sequentially generated error signals, and thereafter treats the average of said predetermined number of error signals as said error signal.

14. In a pressure relief valve system according to claim 5, the further improvement wherein said electronic digital control means is arranged to average consecutive samples of said digital command control pressure signal and said feedback signal over a predetermined number of iterations to generate said error correction signal as the arithmetic mean of differences between said digital command control pressure and feedback signals.

15. In a pressure relief valve system according to claim 5, the further improvement wherein said electronic digital control means is arranged to iteratively measure said command control pressure signal and said feedback signal, to compute the difference therebetween as an error signal, to compare said error signal with said error correction signal, and to deactuate the solenoid to which said error correction signal is provided when said error signal diminishes to a predetermined portion of said error correction signal.

16. In a pressure relief valve system according to claim 15 the further improvement in which said electronic digital control means is arranged to average consecutive samples of said command control pressure and feedback signals over a second predetermined number of iterations and to generate an error signal as the arithmetic mean of differences between said command control pressure and feedback signals.

17. In a pressure relief valve system according to claim 5 the further improvement wherein said electronic digital control means is arranged to serve as a threshold testing means and to provide an error correction signal to a selected one of said solenoids only if said error correction signal achieves a predetermined threshold magnitude.

18. In a pressure relief valve system according to claim 5 the further improvement wherein said electronic digital control means serves as a command control pressure signal limiting means and limits the value of said command control pressure signal to a predetermined maximum.

* * * * *